United States Patent Office 3,623,325
Patented Nov. 30, 1971

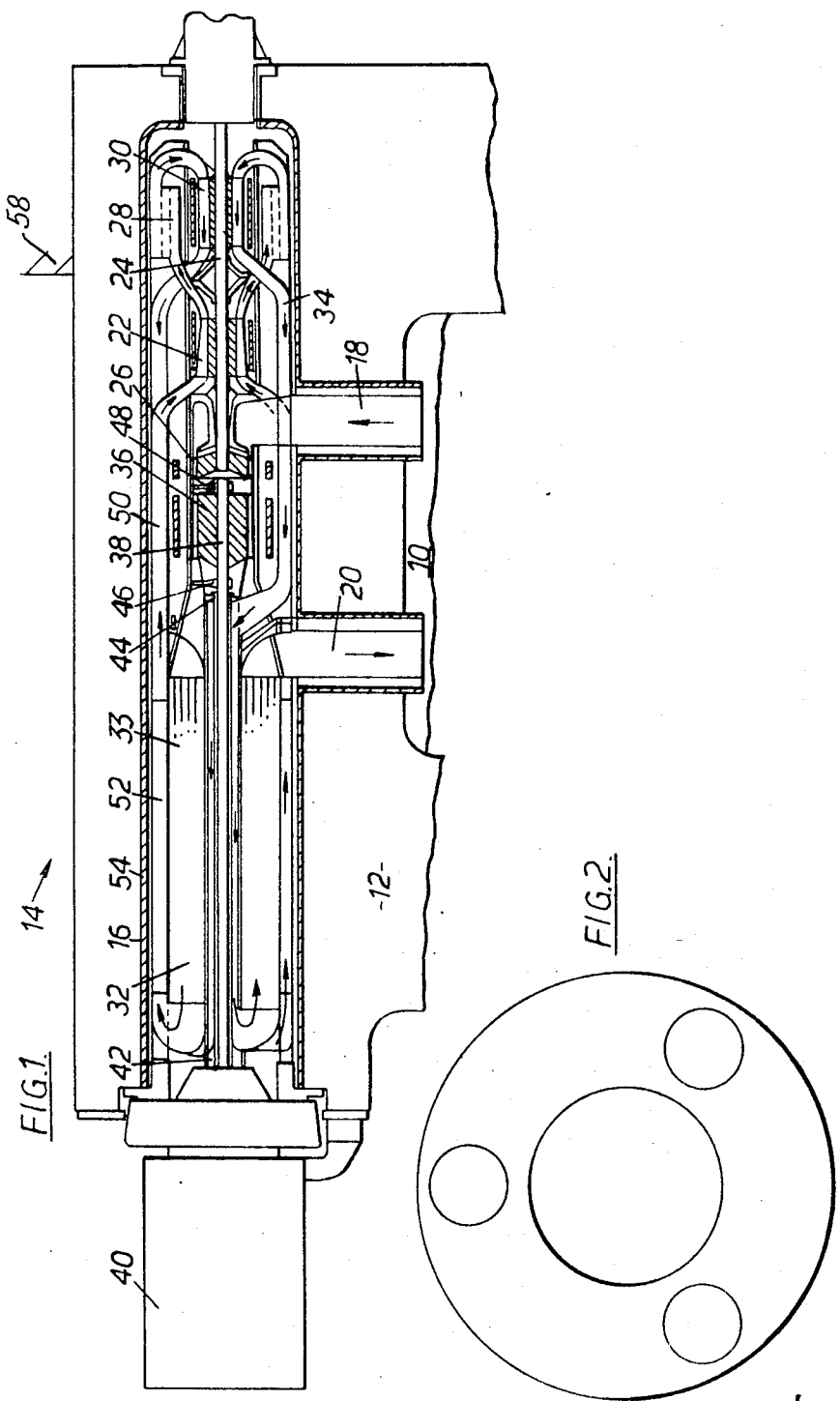

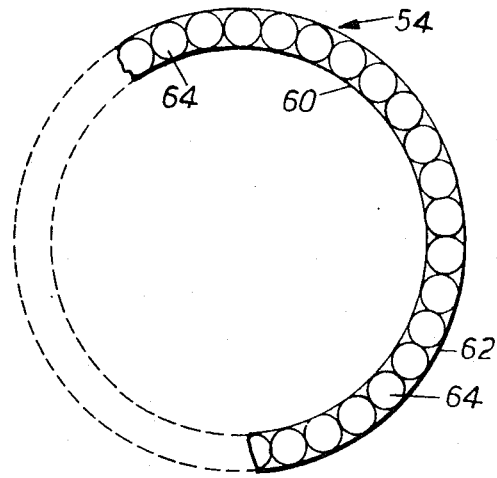
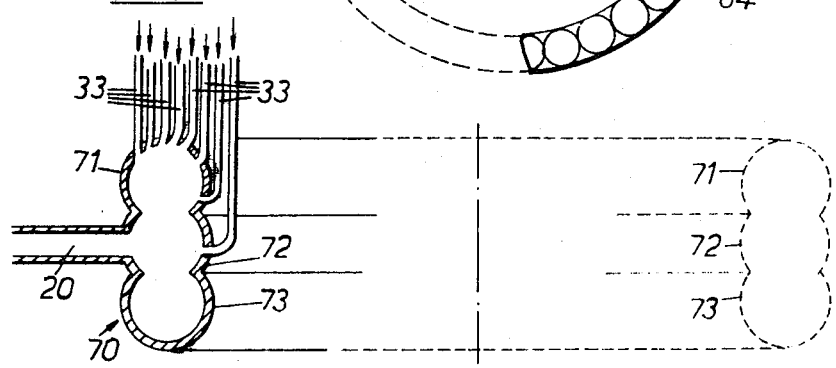
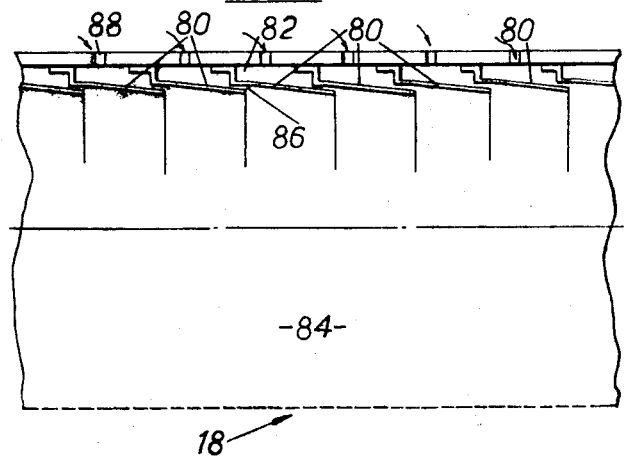

3,623,325
POWER PLANTS
Albert Jubb, Kenilworth, Robert G. Ward, Coventry, James N. Hurst, Repton, John B. Holliday, Derby, and James W. Ashley, Dorking, England, assignors to Rolls-Royce Limited, Derby, England
Filed Oct. 13, 1968, Ser. No. 772,086
Claims priority, application Great Britain, Nov. 1, 1967, 49,638/67
Int. Cl. F01d 25/28
U.S. Cl. 60—108
10 Claims

ABSTRACT OF THE DISCLOSURE

The invention relates to a closed cycle gas turbine engine power plant in which the working fluid of the gas turbine engine is heated by a nuclear reactor. The nuclear reactor and the gas engine turbine are contained within a pressure vessel from which the gas turbine engine is removable, independently of the nuclear reactor, for routine servicing and the like.

---

This invention relates to closed-cycle gas turbine engine power plants.

According to the present invention a closed cycle gas turbine engine power plant comprises compressor means, nuclear reactor means adapted to receive and heat working fluid compressed by the compressor means, turbine means arranged to receive and be driven by working fluid heated by the nuclear reactor means and heat exchange means arranged to receive and cool working fluid expanded in the turbine means and to return cooled working fluid to be compressed in the compressor means, the nuclear reactor means, compressor means, turbine means and heat exchange means being disposed within a pressure vessel and the compressor means and the turbine means being removable from the pressure vessel independently of the nuclear reactor means.

The heat exchange means may also be removable with the compressor means and the turbine means.

Preferably the turbine means comprises, in flow series, a high pressure turbine drivingly connected to the compressor means, and a power turbine adapted to rotate a drive shaft.

According to a further feature of the invention the compressor means, the turbine means and the heat exchange means are disposed within a common supporting structure and connected to the nuclear reactor means by means of conduits, the supporting structure and the nuclear reactor means being mounted within the pressure vessel and the supporting structure being adapted so as to be removable from the pressure vessel independently of the nuclear reactor means.

The compressor means and the turbine means are preferably removable from the common supporting structure independently of the heat exchange means.

The common supporting structure may comprise a substantially cylindrical pod, the compressor means and the turbine means being mounted within and coaxial with the pod.

Preferably there is provided means for cooling the pod.

Thus the pod may be provided with axially extending coolant ducts disposed within its substantially cylindrical wall.

The heat exchange means preferably comprises a plurality of ducts extending substantially axially of the pod and having their interiors arranged to receive working fluid compressed by the compressor means prior to its entry into the nuclear reactor means, the working fluid expanded in the power turbine means being arranged to flow over the external surfaces of the ducts.

In a preferred embodiment of the invention the interiors of the ducts of the heat exchanger means communicate with manifold means comprising a plurality of axially adjacent similar annular manifolds which communicate with each other and are substantially coaxial with the pod at least one of said conduits communicating with and extending substantially radially outwards from said manifolds.

Preferably at least the conduit which is arranged to convey working fluid heated by the nuclear reactor means is provided with cooling means, which may comprise a plurality of internested substantially similar resilient annular members which are coaxial with the conduit and secured to the internal surface thereof and means for supplying coolant to the spaces defined between the internal surface of the conduit and adjacent annular members.

The working fluid is preferably the cooling fluid of the nuclear reactor means.

The invention will now be particularly described, by way of non-limitative example only, with reference to the accompanying drawings, of which:

FIG. 1 is a cross-sectional view of part of a closed cycle gas turbine engine power plant in accordance with the invention;

FIG. 2 is a diagrammatic plan view of a further closed cycle gas turbine engine power plant in accordance with the present invention;

FIG. 3 is a sectional view of a part of the power plant shown in FIG. 1;

FIG. 4 is a sectional view of a further part of the power plant shown in FIG. 1; and FIG. 5 is a sectional view of yet another part of the power plant shown in FIG. 1.

Referring to FIG. 1, 10 indicates a gas cooled nuclear reactor which is contained within a pre-stressed concrete pressure vessel 12, and whose coolant fluid provides the working fluid for a closed cycle gas turbine engine indicated generally at 14. The coolant may be helium or carbon dioxide or argon or mixtures thereof. Alternatively nitrogen or hydrogen may be used or any other fluid suitable, in a gaseous state, for use as a cooling fluid for a nuclear reactor.

As can be seen from FIG. 1 the engine 14 is disposed within a cavity 16 in the pressure vessel 12 with its axis of rotation parallel to the vertical axis of the reactor 10. Supply and return pipes 18 and 20 respectively are connected between the reactor 10 and the engine 14, whereby cooling fluid can pass from the reactor to the engine and after having passed through the engine cycle from the engine back to the reactor.

The engine 14 comprises a low pressure compressor 22 supported on a shaft 24 driven by a turbine 26, hereinafter referred to as the compressor drive turbine, the outlet from the low pressure compressor communicating with a water cooled intercooler 28. The outlet from the intercooler 28 communicates with the inlet to a high pressure compressor 30, also mounted on the shaft 24, the outlet from the high pressure compressor 30 communicating with the inlet of a recuperator 32 via ducts 34.

The recuperator 32 consists of a plurality of tubes 33 which are provided with axially extending external fins (not shown) and which are arranged together in a bundle with their axes parallel and in such a manner that fluid passing from the compressor 30 via the ducts 34 will pass through the tubes 33 in heat exchange relationship with further fluid passing over the external walls of the tube, the source of which further fluid will be hereinafter described.

The recuperator may be of other form and in particular may comprise a plurality of passages formed by the assembly of shaped plates into a pack forming a recuperator.

The outlet of the recuperator 32 communicates with the pipe 20, while the pipe 18 communicates with the inlet of the turbine 26.

The outlet from the turbine 26 communicates with the inlet of a power turbine 36, mounted on a shaft 38 which is arranged co-axially with the shaft 24 and which is connected to drive an electrical alternator 40, whose coolant is preferably the same as that of the reactor but may be supplied from a separate circuit or source.

The shaft 38 extends through the recuperator 32 and is supported in four axially spaced apart bearings 42, 44, 46 and 48.

The outlet from power turbine 36 communicates with the recuperator 32 so that fluid flowing through the turbine 36 can pass over the external surfaces of the tubes 33 in heat exchange relationship with the fluid passing through the tubes 33 and the outlet of this flow path of the recuperator 32 communicates with conduits 50 which communicate with the inlet to the compressor 22.

A pre-cooler 52 is interposed between the recuperator 32 and the conduits 50 to extract heat from the working fluid prior to its entry into the compressor 22.

Both the pre-cooler 52 and the intercooler 28 are water cooled, which water is cooled by an external heat exchanger and is then returned to provide further cooling in the pre-cooler 52 and intercooler 28. The inlet and outlet connections for the pre-cooler 52 and inter-cooler 28 extend through the lower end of the pressure vessel 12, as do oil pipes and other instrumentation (not shown).

The engine 14 together with the recuperator 32, precooler 52 and intercooler 28 are housed in common supporting structure constituted by a substantially cylindrical pod 54 which can be removed from the pressure vessel 12, independently of the reactor 10, for servicing, repair and the like of the engine 14, recuperator 32, pre-cooler 52 and intercooler 28.

The compressors 22 and 30 together with the turbine 26 may be separately detachable as a unit from the pod 54.

When the plant is in use gas from the reactor 10 passes through the supply pipe 18 to the inlet to the compressor drive turbine 26, to effect rotation of the compressors 22 and 30. After passing through the turbine 26, the gas passes through the power turbine 36 to effect rotation of the shaft 38 and thus the alternator 40.

On leaving the power turbine 36 the gas passes over the external walls of the tubes 33 in the recuperator 32 where it is cooled by gas which has left the high pressure compresor 30 and enters the pre-cooler 52 where it is cooled still further. The gas then enters the compressor 26 where its pressure is increased and then passes to the intercooler 28.

On leaving the intercooler 28 the gas passes through the compressor 30 and enters the tubes 33 of the recuperator 32 where it receives heat from the gases which have passed through the power turbine 36 and then return to the reactor 10 via the pipe 20.

It will be appreciated that whilst a gas cooled nuclear reactor has been referred to in the specific embodiment a fast gas cooled reactor may be employed as may a reactor cooled by fluids which pass in heat exchange relationship to the working fluid of the engine.

In FIG. 1 the line 58 indicates ground level and it will thus be appreciated that the engine 14 can be removed from the concrete pressure vessel 12 by raising the pod 54 vertically upwards. Suitable valve means may be provided in the conduits 18 and 20 to prevent the escape of fluid.

Alternatively the engine 14 can be lowered vertically from the pressure vessel 12.

Turning now to FIG. 3, which is a section at right angles to the axis of the pod 54, it can be seen that the pod 54 comprises spaced apart radially inner and radially outer walls 60, 62 respectively. A plurality of tubes 64, extending parallel to the axis of the pod 54, are positioned in the annular space between the walls 60, 62.

In operation coolant is supplied to the tubes 64 so as to cool the pod 54, thereby reducing the tendency of the pod 54 to distort in the region of high temperature zones therein. The coolant may be water supplied either from the same source which supplies the water to the precooler 52 and the intercooler 28 or from a separate source.

FIG. 4 is a sectional view in a plane containing the axis of the pod 54 and shows one way in which the tubes 33 of the recuperator 32 may be joined to the pipe 20. The tubes 33 communicate with a "multiple-bubble" annular manifold 70 which is coaxial with the pod 54 and which comprises three axially adjacent substantially similar circular manifolds 71, 72, 73 which are welded or otherwise secured together so as to form a single annular chamber. Substantially all of the tubes 33 communicate with the radially inner surface of the manifold 70, while the pipe 70 projects radially outwardly from the outer surface of the manifold 70. The form of the manifold 70 ensures that the interconnection between the pipe 20 and the tubes 33 is of adequate strength while being relatively compact.

FIG. 5 is an axial section of the pipe 18 and shows that the pipe 18 is provided with cooling means comprising a plurality of internested frusto-conical resilient annular members 80 which are bonded or otherwise secured about their entire peripheries to the internal surface of the pipe 18. It will be appreciated that small annular chambers 82 are defined between the internal surface of the pipe 18 and adjacent members 80 which chambers communicate with the interior 84 of the pipe 18 via small annular gaps 86 between adjacent members 80. A plurality of holes 88 are provided in the wall of the pipe 18 to communicate with each of the chambers 82.

In operation, working fluid heated by the nuclear reactor 10 flows through the interior 84 of the pipe 18, and coolant (which may be working fluid bled from a point within the compressors of the engine 14) is supplied to the holes 88 and thence to the chambers 82. The coolant then passes into the pipe 18 via the gaps 86, thus cooling the walls of the pipe 18. The rate of coolant flow is determined by the pressure of its supply, the pressure in the interior of the pipe 18 and the resilience of the members 80, which resilience determines the extent to which the gaps 86 open.

Further embodiments of the invention would include arrangements in which instead of the compressor means, turbine means and heat exchangers being in a common casing or supporting structure, each integer could be in a separate casing or supporting structure and disposed about the reactor.

Whilst in the embodiment of the invention shown in FIGS. 1, 3, 4 and 5 only one gas turbine engine 14 has been illustrated, more than one engine may be used, as shown in FIG. 2, all the engines being connected to the same heat source.

Furthermore whilst the engines 14 described above are disposed vertically it will be appreciated that they can be disposed horizontally.

What we claim is:

1. A closed cycle gas turbine engine power plant comprising compressor means, nuclear reactor means adapted to receive and heat working fluid compressed by the compressor means, turbine means arranged to receive and be driven by working fluid heated by the nuclear reactor means and heat exchange means arranged to receive and cool working fluid expanded in the turbine means and to return cooled working fluid to be compressed in the compressor means, the nuclear reactor means, compressor means, turbine means and heat exchange means being disposed within a pressure vessel, and the compressor means, the turbine means and the heat exchange means being mounted within a common supporting structure, the structure being removable from the pressure vessel independently of the nuclear reactor means.

2. A power plant as claimed in claim 1, wherein the turbine means comprises, in flow series, a high pressure turbine drivingly connected to the compressor means and a power turbine adapted to rotate a drive shaft.

3. A power plant as claimed in claim 1, wherein the compressor means and the turbine means are removable from the common supporting structure independently of the heat exchange means.

4. A power plant as claimed in claim 1, wherein the common supporting structure comprises a substantially cylindrical pod, the compressor means and the turbine means being mounted within and coaxial with the pod.

5. A power plant as claimed in claim 4, wherein there is provided means for cooling the pod.

6. A power plant as claimed in claim 5, wherein the pod is provided with axially extending coolant ducts disposed within its substantially cylindrical wall.

7. A power plant as claimed in claim 1, wherein the heat exchange means comprises a plurality of ducts extending substantially axially of the pod and having their interiors arranged to receive working fluid compressed by the compressor means prior to its entry into the nuclear reactor means, the working fluid expanded in the turbine means being arranged to flow over the external surfaces of the ducts.

8. A power plant as claimed in claim 7, wherein the interiors of the ducts of the heat exchange means communicate with manifold means comprising a plurality of axially adjacent similar annular manifolds which communicate with each other and are substantially coaxial with the pod at least one of said conduits communicating with and extending substantially radially outwards from said manifolds.

9. A power plant as claimed in claim 8, wherein at least the conduit which is arranged to convey working fluid heated by the nuclear reactor means is provided with cooling means.

10. A power plant as claimed in claim 9, wherein said cooling means comprises a plurality of internested substantially similar resilient annular members which are coaxial with the conduit and secured to the internal surface thereof and means for supplying coolant to the spaces defined between the internal surface of the conduit and adjacent annular members, the arrangement being such that said coolant then flows between adjacent annular members into said conduit.

References Cited
UNITED STATES PATENTS 3,070,530  12/1962  Metcalf _____ 60—59 T X

OTHER REFERENCES

The Closed-Cycle Gas-Cooled Reactor, publication of the Ford Instrument Co., May 1956.

MARTIN P. SCHWADRON, Primary Examiner

A. M. OSTRAGER, Assistant Examiner

U.S. Cl. X.R.

60—36